(12) United States Patent
Oda et al.

(10) Patent No.: US 7,655,892 B2
(45) Date of Patent: Feb. 2, 2010

(54) SOLID-STATE IMAGING DEVICE, AND METHOD OF DRIVING SOLID-STATE IMAGING DEVICE

(75) Inventors: Kazuya Oda, Saitama (JP); Tomohiro Sakamoto, Miyagi (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 137 days.

(21) Appl. No.: 11/086,763

(22) Filed: Mar. 23, 2005

(65) Prior Publication Data

US 2005/0212939 A1  Sep. 29, 2005

(30) Foreign Application Priority Data

Mar. 29, 2004  (JP) ............................ P.2004-095773

(51) Int. Cl.
*H01L 27/00* (2006.01)
*G01J 3/50* (2006.01)

(52) U.S. Cl. .................................... 250/208.1; 250/226

(58) Field of Classification Search .............. 250/208.1, 250/226, 239; 348/272–283, 294, 302–324, 348/332; 257/414, 428, 431–466; 438/57–60
See application file for complete search history.

(56) References Cited

U.S. PATENT DOCUMENTS

| | | | | |
|---|---|---|---|---|
| 4,758,883 A | * | 7/1988 | Kawahara et al. | ......... 348/222.1 |
| 5,274,476 A | * | 12/1993 | Lee | ............... 358/483 |
| 5,306,906 A | * | 4/1994 | Aoki et al. | ............... 250/208.1 |
| 6,211,915 B1 | * | 4/2001 | Harada | ......................... 348/298 |
| 7,095,441 B2 | * | 8/2006 | Nagano | ....................... 348/308 |
| 2004/0017497 A1 | | 1/2004 | Suzuki et al. | |
| 2004/0051790 A1 | | 3/2004 | Tamaru et al. | |

FOREIGN PATENT DOCUMENTS

| | | |
|---|---|---|
| JP | 09-116815 | 5/1997 |
| JP | 2001-238126 | 8/2001 |
| JP | 2003-304456 | 10/2003 |
| JP | 2004-55786 | 2/2004 |
| JP | 2004-80332 | 3/2004 |

* cited by examiner

*Primary Examiner*—Georgia Y Epps
*Assistant Examiner*—Pascal M Bui-Pho
(74) *Attorney, Agent, or Firm*—McGinn IP Law Group, PLLC

(57) ABSTRACT

A solid-state imaging device comprises: a semiconductor substrate; and a plurality of photoelectric conversion elements forming a square lattice pattern extending in a column direction and in a row direction substantially perpendicular to the row direction, on a surface of the semiconductor substrate, wherein said plurality of photoelectric conversion elements comprises: a plurality of first photoelectric conversion elements that conduct photoelectric conversion of a relatively higher sensitivity on an amount of incident light; and a plurality of second photoelectric conversion elements that conduct photoelectric conversion of a relatively lower sensitivity on the amount of incident light, wherein said plurality of first photoelectric conversion elements and said plurality of second photoelectric conversion elements are arranged in respective checkered patterns, and wherein said plurality of first photoelectric conversion elements are larger in size than said plurality of second photoelectric conversion elements.

20 Claims, 9 Drawing Sheets

FIG. 10

| Gc | ○ | Gc | ○ | Gc | ○ | Gc | ○ |
|----|---|----|---|----|---|----|---|
| ○ | Bc | ○ | Rc | ○ | Bc | ○ | Rc |
| Gc | ○ | Gc | ○ | Gc | ○ | Gc | ○ |
| ○ | Rc | ○ | Bc | ○ | Rc | ○ | Bc |
| Gc | ○ | Gc | ○ | Gc | ○ | Gc | ○ |
| ○ | Bc | ○ | Rc | ○ | Bc | ○ | Rc |
| Gc | ○ | Gc | ○ | Gc | ○ | Gc | ○ |
| ○ | Rc | ○ | Bc | ○ | Rc | ○ | Bc |

SOLID-STATE IMAGING DEVICE, AND METHOD OF DRIVING SOLID-STATE IMAGING DEVICE

BACKGROUND OF THE INVENTION

1. Field of the Invention

The present invention relates to a solid-state imaging device including plural photoelectric conversion elements which are arranged in a square lattice on a semiconductor substrate in a row direction and a column direction that is perpendicular to the row direction.

2. Description of the Related Art

In a solid-state imaging device which is useful in a digital camera, charges corresponding to image signals are detected by photoelectric conversion elements, and hence it is difficult in general to widen the dynamic range. In order to obtain an image of a wide dynamic range, therefore, it has been proposed to use a solid-state imaging device having relatively higher-sensitive photoelectric conversion elements, and relatively lower-sensitive photoelectric conversion elements (see JP-A-2001-238126).

In the imaging device disclosed in JP-A-2001-238126, rows of the high-sensitive photoelectric conversion elements, and those of the low-sensitive photoelectric conversion elements are alternately arranged. For an image based on image signals read out from the imaging device, high-sensitivity image signals due to the high-sensitive photoelectric conversion elements, and low-sensitivity image signals due to the low-sensitive photoelectric conversion elements are separately generated for respective rows. Thereafter, the image signals undergo an interpolating process to be expanded, and are then combined with each other at a predetermined mixture ratio, whereby a picked-up image signal with a wide dynamic range can be obtained.

Another solid-state imaging device is known. The solid-state imaging device is a CCD device which has photoelectric conversion elements arranged in a honeycomb pattern, and in which a hole is opened in a vertical transfer path at an imaginary pixel position, and a color filter is not disposed above the hole (see JP-A-2003-304456). Signal charges generated by light passing through the hole are those which have not been passed through a color filter. Therefore, the signal charges are used as luminance data, and image data read out from the photoelectric conversion elements are corrected in accordance with the luminance data, thereby enabling an image of high resolution and high accuracy to be produced.

However, the imaging device disclosed in JP-A-2001-238126 has a problem in that, when a picked-up image with an expanded dynamic range is to be obtained, the resolution in at least one of the longitudinal and lateral directions is lowered.

Furthermore, the sizes of the high-sensitive photoelectric conversion elements and the low-sensitive photoelectric conversion elements of the imaging device disclosed in JP-A-2001-238126 are not specifically described.

SUMMARY OF THE INVENTION

The invention has been conducted in view of the above-discussed circumstances. It is an object of the invention to provide a solid-state imaging device in which the dynamic range can be expanded without lowering the resolution.

According to the invention, there is provided a solid-state imaging device comprising: a semiconductor substrate; and a plurality of photoelectric conversion elements forming a square lattice pattern extending in a column direction and in a row direction substantially perpendicular to the row direction, on a surface of the semiconductor substrate, wherein said plurality of photoelectric conversion elements comprises: a plurality of first photoelectric conversion elements that conduct photoelectric conversion of a relatively higher sensitivity on an amount of incident light; and a plurality of second photoelectric conversion elements that conduct photoelectric conversion of a relatively lower sensitivity on the amount of incident light, wherein said plurality of first photoelectric conversion elements and said plurality of second photoelectric conversion elements are arranged in respective checkered patterns, and wherein said plurality of first photoelectric conversion elements are larger in size than said plurality of second photoelectric conversion elements.

According to the configuration, when picked-up images due to first and second photoelectric conversion elements which are adjacent to each other are combined together, the resulting combined signal can be deemed as an independent pixel which is positioned at the center of gravity of two pixels, and virtually constitutes image signals arranged in a checkered pattern. Therefore, the dynamic range can be expanded without substantially lowering the resolution. Moreover, the first photoelectric conversion elements are larger in size than the second photoelectric conversion elements. Therefore, the charge accumulation capacity of the first photoelectric conversion elements can be made larger than that in the case where photoelectric conversion elements of the same size are arranged on a substrate of the same area. As a result, the SN ratio of the image signals obtained from the first photoelectric conversion elements can be improved.

According to the invention, there is provided the solid-state imaging device, wherein the square lattice pattern comprises a plurality sets, each comprising a subset of the photoelectric conversion elements arranged in one of the column direction and the row direction, wherein the solid-state imaging device further comprises: a plurality of vertical transfer portions that transfer charges from said plurality of photoelectric conversion elements in the column direction, each of said plurality of vertical transfer portions corresponding to each of the subsets of the photoelectric conversion elements arranged in the column direction; a horizontal transfer portion that transfers charges transferred by the vertical transfer portions, in the row direction; and an output portion that outputs a signal corresponding to charges transferred by the horizontal transfer portion, wherein said plurality of vertical transfer portions comprises: a plurality of vertical transfer channels arranged in the column direction in the semiconductor substrate, each of the vertical transfer channels corresponding to each of the subsets of the photoelectric conversion elements arranged in the column direction; a plurality of vertical transfer electrodes arranged to substantially cross the vertical transfer channels when viewed from a vertical direction to a plane of the semiconductor substrate; and a plurality of charge reading regions that read out charges from the photoelectric conversion elements to the vertical transfer channels, each of the photoelectric conversion elements corresponds to one of the vertical transfer electrodes, said plurality of charge reading regions comprises: a plurality of first charge reading regions corresponding to said plurality of first photoelectric conversion elements; and a plurality of second charge reading regions corresponding to said plurality of second photoelectric conversion elements, and said plurality of vertical transfer electrodes comprises: a plurality of first vertical transfer electrodes corresponding to the first charge reading regions; and a plurality of second vertical transfer electrodes corresponding to the second charge reading regions, in which the first vertical transfer electrodes are positioned at positions different from the second vertical transfer electrodes.

According to the configuration, it is possible to provide a solid-state imaging device in which charges can be read out by various methods, and which is therefore easy to use.

According to the invention, there is provided the solid-state imaging device, wherein the vertical transfer channels have a linear shape which elongates in the column direction between the subsets of the photoelectric conversion elements arranged in the column direction, the vertical transfer electrodes have a meandering shape which elongates in the row direction as a whole between the photoelectric conversion elements, the first photoelectric conversion elements and the second photoelectric conversion elements have substantially equal lengths in the row direction with respect to their centers, and the first photoelectric conversion elements have lengths in the column direction with respect to the centers longer than that of the second photoelectric conversion elements.

According to the invention, there is provided the solid-state imaging device, wherein the vertical transfer channels have a meandering shape which elongates in the column direction as a whole between the photoelectric conversion elements, the vertical transfer electrodes have a meandering shape which elongates in the row direction as a whole between the photoelectric conversion elements, the first photoelectric conversion elements have lengths in the row direction with respect to their centers longer than that of the second photoelectric conversion elements, and the first photoelectric conversion elements have lengths in the column direction with respect to the centers longer than that of the second photoelectric conversion elements.

According to the invention, there is provided a method of driving the solid-state imaging device, the method comprising: conducting application of a first read pulse to the first vertical transfer electrodes and application of a second read pulse to the second vertical transfer electrodes in different fields; and independently reading out signals corresponding to charges respectively from the first photoelectric conversion elements and the second photoelectric conversion elements.

According to the invention, there is provided a method of driving the solid-state imaging device, the method comprising:
conducting application of a first read pulse to the first vertical transfer electrodes; and reading out only charges from the first photoelectric conversion elements.

According to the invention, there is provided a method of driving the solid-state imaging device, wherein said plurality of charge reading regions comprises: a plurality of third charge reading regions corresponding to odd ones of the subsets of the photoelectric conversion elements arranged in the row direction; and a plurality of fourth charge reading regions corresponding to even ones of the subsets of the photoelectric conversion elements arranged in the row direction, wherein the method comprises: conducting application of a third read pulse to ones of said plurality of vertical transfer electrodes corresponding to the third charge reading regions and application of a fourth read pulse to ones of said plurality of vertical transfer electrodes corresponding to the fourth charge reading regions in different fields; and reading out charges from the odd ones of the subsets of the photoelectric conversion elements arranged in the row direction separately from charges from the even ones of the subsets of the photoelectric conversion elements arranged in the row direction.

According to the invention, there is provided a method of driving the solid-state imaging device, wherein said plurality of charge reading regions comprises: a plurality of fifth charge reading regions corresponding to odd ones of the subsets of the photoelectric conversion elements arranged in the column direction; and a plurality of sixth charge reading regions corresponding to even ones of the subsets of the photoelectric conversion elements arranged in the column direction, wherein the method comprises: conducting application of a fifth read pulse to ones of said plurality of vertical transfer electrodes corresponding to the fifth charge reading regions and application of a sixth read pulse to ones of said plurality of vertical transfer electrodes corresponding to the sixth charge reading regions in a same field; and reading out charges from one of the first photoelectric conversion elements and charges from one of the second photoelectric conversion elements with being mixed with each other, said one of the first photoelectric conversion elements and said one of the second photoelectric conversion elements being adjacent to each other in the column direction.

BRIEF DESCRIPTION OF THE DRAWINGS

FIG. 10 is a diagram showing a pixel arrangement after a combining process in the digital camera illustrating the first embodiment of the invention;

DETAILED DESCRIPTION OF THE INVENTION

Hereinafter, embodiments of the invention will be described with reference to the accompanying drawings.

FIRST EMBODIMENT

Figure 1:
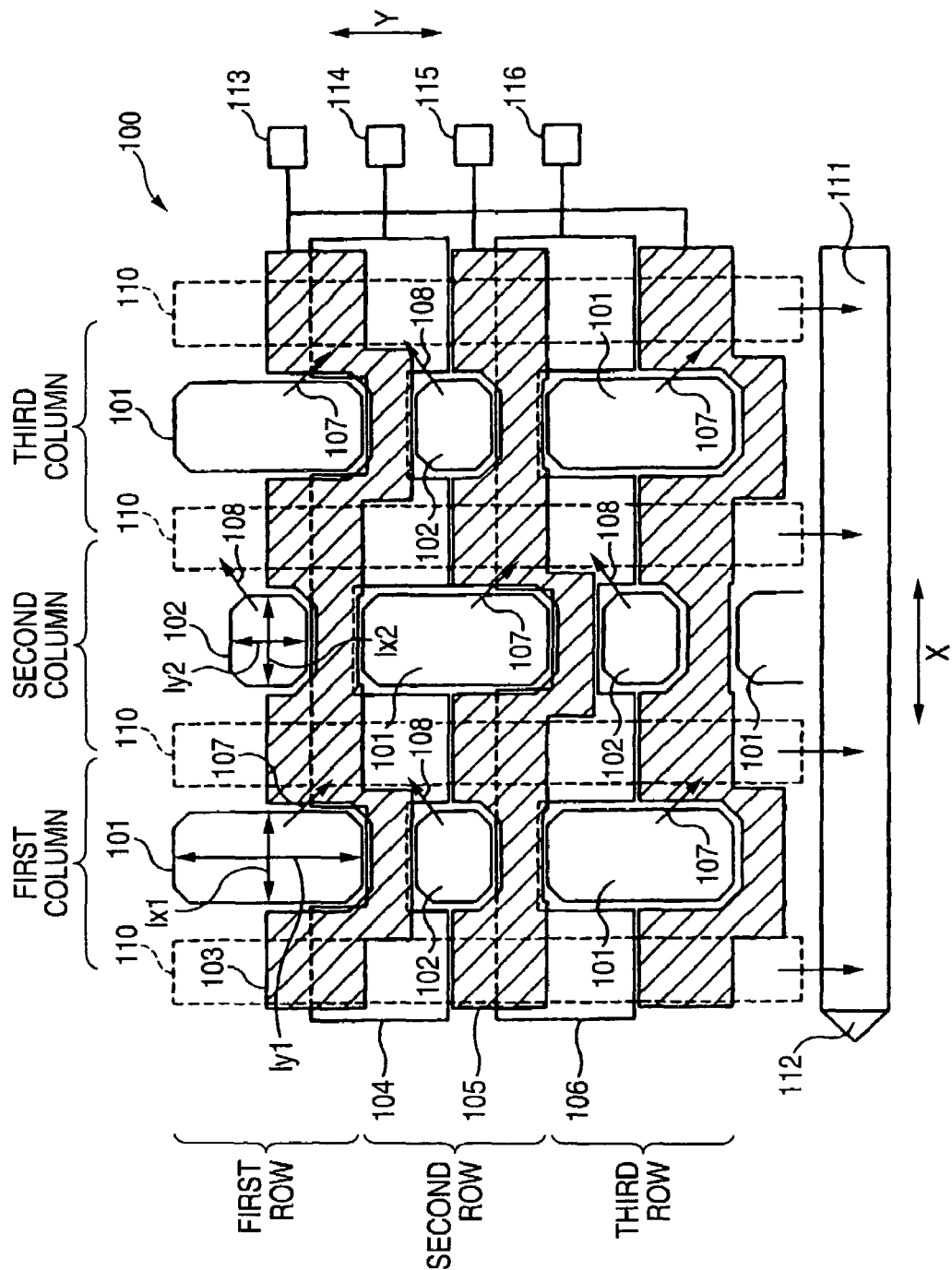
FIG. 1 is a view schematically showing the configuration of a solid-state imaging device illustrating a first embodiment of the invention.

FIG. 1 is a view schematically showing the configuration of a solid-state imaging device 100 illustrating a first embodiment of the invention. FIG. 1 is a partial enlarged view of the solid-state imaging device 100.

The solid-state imaging device 100 includes: plural first photoelectric conversion elements 101 and second photoelectric conversion elements 102 (hereinafter, often referred to merely as photoelectric conversion elements) which are arranged in a square lattice on a surface of a semiconductor substrate in a row direction (the direction X in FIG. 1) and a column direction (the direction Y in FIG. 1) that is perpendicular to the row direction; vertical transfer portions 110 which are disposed to respectively correspond to plural photoelectric conversion element columns each configured by the photoelectric conversion elements that are arranged in the column direction, and which transfer charges from the photoelectric conversion elements in the column direction; a horizontal transfer portion 111 which transfers charges transferred by the vertical transfer portions 110, in the row direction; and an output portion 112 which outputs a signal corresponding to charges transferred by the horizontal transfer portion 111. For example, the first photoelectric conversion elements 101 and the second photoelectric conversion elements 102 are photodiodes. In FIG. 1, the first and second photoelectric conversion elements 101 and 102 show not only regions which can be seen through openings for the elements, but also the sizes of the first and second photoelectric conversion elements 101 and 102 themselves.

The first photoelectric conversion elements 101 conduct photoelectric conversion of a relatively higher sensitivity on the amount of light which is incident on the solid-state imaging device 100, and are arranged in a checkered pattern. The second photoelectric conversion elements 102 conduct photoelectric conversion of a relatively lower sensitivity on the amount of light which is incident on the solid-state imaging device 100, and are arranged in a checkered pattern. Each of the first and second photoelectric conversion elements 101 and 102 has an octagonal shape. However, the shapes of the elements are not particularly restricted to this. The sensitivity of each of the first and second photoelectric conversion elements 101 and 102 can be changed by changing the area of the light receiving surface of the photoelectric conversion element, or by changing the light collecting area by means of a microlens disposed above the photoelectric conversion element. These methods are well known, and hence their description is omitted.

The first photoelectric conversion elements 101 are larger in size than the second photoelectric conversion elements 102. The device is designed so that, as shown in FIG. 1, the length Lx1 in the row direction of each of the first photoelectric conversion elements 101 with respect to the center of the element is substantially equal to the length Lx2 in the row direction of each of the second photoelectric conversion elements 102 with respect to the center of the element, and the length Ly1 in the column direction of each of the first photoelectric conversion elements 101 with respect to the center of the element is longer than the length Ly2 in the column direction of each of the second photoelectric conversion elements 102 with respect to the center of the element. In the case where the sensitivity of the first photoelectric conversion elements 101 is set to be higher than that of the second photoelectric conversion elements 102, no problem occurs even when the charge accumulation capacity of the second photoelectric conversion elements 102 is sufficiently smaller than that of the first photoelectric conversion elements 101. In the embodiment, as shown in FIG. 1, the size of the first photoelectric conversion elements 101 is lager than that of the second photoelectric conversion elements 102, so that the charge accumulation capacity of the first photoelectric conversion elements 101 is made larger and that of the second photoelectric conversion elements 102 is made smaller. Therefore, the SN ratio of the image signals obtained from the first photoelectric conversion elements 101 can be improved, and the image quality can be enhanced.

The vertical transfer portions 110 include: plural vertical transfer channels (not shown) which are formed in the column direction on the semiconductor substrate to respectively correspond to the photoelectric conversion element columns each configured by plural photoelectric conversion elements arranged in the column direction; plural vertical transfer electrodes 103 to 106 (in FIG. 1, only a part of the vertical transfer electrodes are designated by the reference numerals) which are formed above the vertical transfer channels; and first charge reading regions 107 and second charge reading regions 108 (in FIG. 1, the regions are diagrammatically indicated by the arrows) which read out charges from the first and second photoelectric conversion elements 101 and 102 to the vertical transfer channels. Each of the vertical transfer electrodes 103 to 106 has a meandering shape which elongates in the row direction as a whole between the photoelectric conversion elements.

The vertical transfer channels are linear regions of a constant width which elongate in the column direction along the sides of the first and second photoelectric conversion elements 101 and 102. The regions into which charges are to be accumulated, and along which the accumulated charges are to be transferred are defined by the vertical transfer electrodes 103 to 106 which are formed above the regions. The vertical transfer electrodes 103 to 106 are disposed so that two of the electrodes correspond to each of the first and second photoelectric conversion elements 101 and 102. Four-phase vertical transfer pulses (hereinafter, referred to also as driving pulses) are applied to the vertical transfer electrodes 103 to 106 via terminals 113 to 116, so that charges in the vertical transfer channels are transferred in the column direction. Alternatively, the vertical transfer electrodes 103 to 106 may be disposed so that two or more of the electrodes correspond to each of the first and second photoelectric conversion elements 101 and 102.

The first charge reading regions 107 are disposed at positions corresponding to the vertical transfer electrodes 103 and 105, and the second charge reading regions 108 are disposed at positions corresponding to the vertical transfer electrodes 104 and 106. The operation of reading out charges from the first photoelectric conversion elements 101 to the vertical transfer channels is conducted by superimposing a read pulse on the first-phase vertical transfer pulse applied to the terminal 113, and also on the third-phase vertical transfer pulse applied to the terminal 115. The operation of reading out charges from the second photoelectric conversion elements 102 to the vertical transfer channels is conducted by superimposing a read pulse on the fourth-phase vertical transfer pulse applied to the terminal 114, and also on the second-phase vertical transfer pulse applied to the terminal 116.

In FIG. 1, sets of plural photoelectric conversion elements which are arranged in the row direction (X direction) are formed as photoelectric conversion element rows, and their identifications (first row, second row, and third row) are indicated on the sides of the rows. Moreover, sets of plural photoelectric conversion elements which are arranged in the column direction (Y direction) are formed as photoelectric conversion element columns, and their identifications (first column, second column, and third column) are indicated above the columns. In the solid-state imaging device 100, a large number of the photoelectric conversion element rows and photoelectric conversion element columns are formed on the semiconductor substrate.

Figure 2:
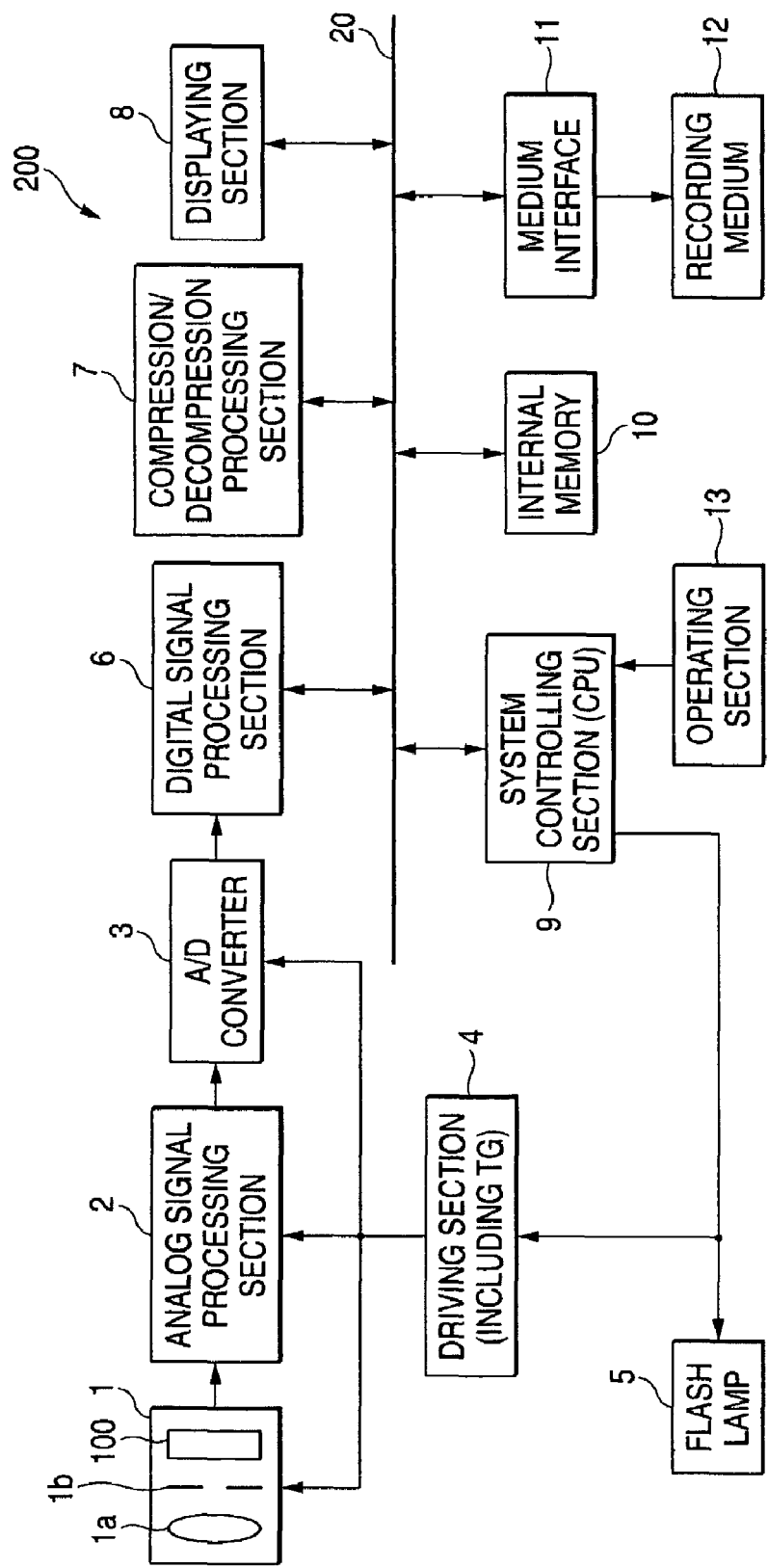
FIG. 2 is a diagram schematically showing the configuration of a digital camera illustrating the first embodiment of the invention.

FIG. 2 is a diagram schematically showing the configuration of a digital camera 200 illustrating the first embodiment of the invention.

The digital camera 200 comprises an imaging section 1, an analog signal processing section 2, an A/D converter 3, a driving section 4, a flash lamp 5, a digital signal processing section 6, a compression/decompression processing section 7, a displaying section 8, a system controlling section 9, an internal memory 10, a medium interface 11, a recording medium 12, and an operating section 13. The digital signal processing section 6, the compression/decompression processing section 7, the displaying section 8, the system controlling section 9, the internal memory 10, and the medium interface 11 are connected to a system bus 20.

The imaging section 1 includes an imaging optical system 1a such as an imaging lens, a mechanical shutter 1b, and the solid-state imaging device 100 shown in FIG. 1. The imaging section takes an image of an object, and outputs an analog picked-up signal. The analog signal processing section 2 applies a predetermined analog signal process on the picked-up image signal obtained in the imaging section 1. The A/D converter 3 converts the analog signal processed by the analog signal processing section 2, to a digital signal. An output of the A/D converter 3 is sent as a so-called RAW image data to the digital signal processing section 6.

In an imaging process, the imaging optical system 1a is controlled via the driving section 4. In response to turning-on of a release switch (not shown) operated by a release button (not shown) which is a part of the operating section 13, the solid-state imaging device 100 is driven at a predetermined timing by a driving signal supplied from a timing generator (in FIG. 2, abbreviated to TG) which is included in the driving section 4. The driving section 4 is controlled so as to output a predetermined driving signal by the system controlling section 9.

The digital signal processing section 6 applies a digital signal process corresponding to an operation mode which is set by the operating section 13, on the digital image data supplied from the A/D converter 3. Processes to be conducted by the digital signal processing section 6 include a black level correcting process (OB process), a linear matrix correcting process, a white balance adjusting process, a gamma correcting process, an image combining process, a composing process, and a Y/C converting process. The digital signal processing section 6 is configured by, for example, a DSP.

The compression/decompression processing section 7 applies a compressing process on a Y/C data obtained in the digital signal processing section 6, and an expanding process on compressed image data obtained from the recording medium 12.

The displaying section 8 includes, for example, an LCD display device, and displays an image based on image data which have undergone the digital signal process after an imaging process, and also an image based on image data which have been obtained by expanding compressed image data recorded on the recording medium. The displaying section can display also a through image obtained in an imaging process, various status of the digital camera, information related to the operation, and other data.

The internal memory 10 is, for example, a DRAM, and used as a work memory for the digital signal processing section 6 and the system controlling section 9. The internal memory is used also as a buffer memory which temporarily stores picked-up image data to be recorded onto the recording medium 12, and that for image data to be displayed on the displaying section 8. The medium interface 11 is used for inputting and outputting data into and from the recording medium 12 such as a memory card.

The system control section 9 is configured mainly by a processor which operates in accordance with predetermined programs, and controls the operations of the whole digital camera including an imaging operation.

The operating section 13 is used for conducting various operations during the use of the digital camera.

Hereinafter, the driving of the solid-state imaging device 100 will be described. The solid-state imaging device 100 can be driven by methods (1) to (4) below.

(1) Independent Readout

Figure 3:
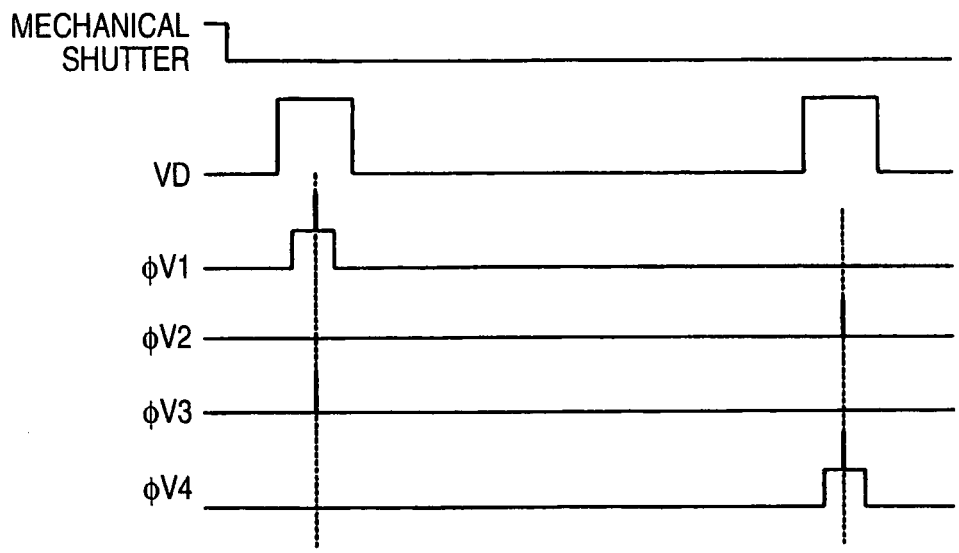
FIG. 3 is a timing chart illustrating a method of driving the solid-state imaging device illustrating the first embodiment of the invention.

FIG. 3 is a timing chart illustrating driving method (1) for the solid-state imaging device 100. FIG. 3 shows a vertical synchronizing signal VD, the opening/closing state of the mechanical shutter 1b, the driving pulse φV1 applied to the terminal 113, the driving pulse φV4 applied to the terminal 114, the driving pulse φV3 applied to the terminal 115, and the driving pulse φV2 applied to the terminal 116. The interval of the vertical synchronizing signal VD is set as one field.

Figure 4:
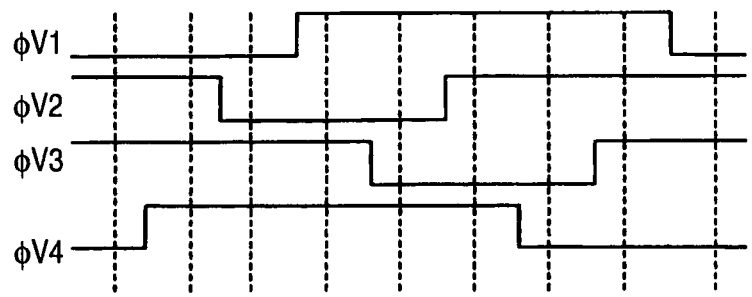
FIG. 4 is a timing chart showing a timing of transferring charges in the solid-state imaging device illustrating the first embodiment of the invention.

As shown in FIG. 3, during a period when the mechanical shutter 1b is closed, in synchronization with the vertical synchronizing signal VD, the driving pulse φV1 on which the read pulse (the portion indicated by the thick line) is superimposed is applied to the terminal 113, and the driving pulse φV3 on which the read pulse is superimposed is applied to the terminal 115. As a result, charges from the first charge reading regions 107 are read out into the vertical transfer channels. As shown in FIG. 4, then, the driving pulses are repeatedly applied to the terminals 113 to 116 to transfer the read-out charges in the column direction. In the horizontal transfer portion 111, the charges which are read out from the first photoelectric conversion elements 101 of one row are transferred at any time to the output portion 112.

In synchronization with the next vertical synchronizing signal VD, the driving pulse φV2 on which the read pulse is superimposed is applied to the terminal 116, and the driving pulse φV4 on which the read pulse is superimposed is applied to the terminal 114. As a result, charges from the second charge reading regions 108 are read out into the vertical transfer channels. As shown in FIG. 4, then, the driving pulses are repeatedly applied to the terminals 113 to 116 to transfer the read-out charges in the column direction. In the horizontal transfer portion 111, the charges which are read out from the second photoelectric conversion elements 102 of one row are transferred at any time to the output portion 112.

In the solid-state imaging device 100, therefore, charges from the first photoelectric conversion elements 101, and those from the second photoelectric conversion elements 102 can be independently read out.

(2) Line Readout

Figure 5:
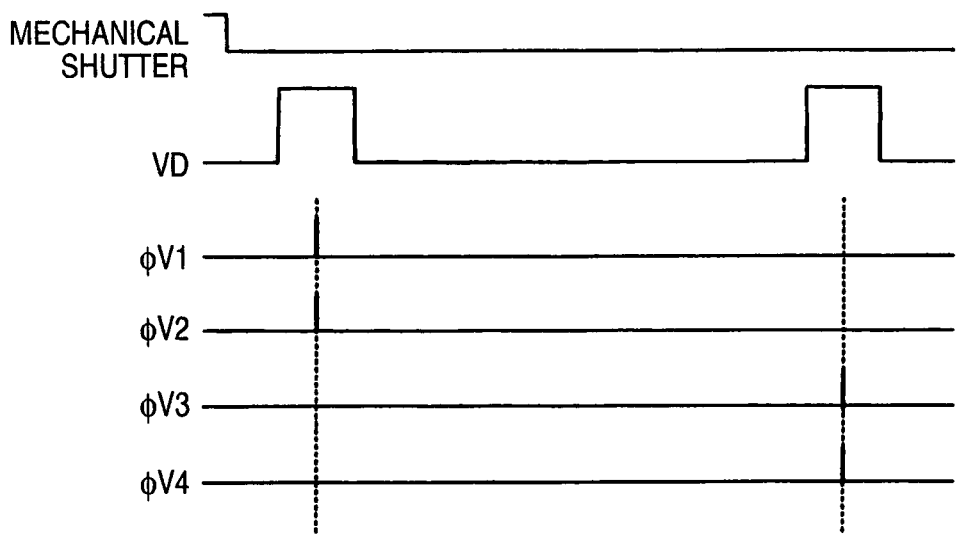
FIG. 5 is a timing chart illustrating a method of driving the solid-state imaging device illustrating the first embodiment of the invention.

FIG. 5 is a timing chart illustrating driving method (2) for the solid-state imaging device 100. FIG. 5 shows the vertical synchronizing signal VD, the opening/closing state of the mechanical shutter 1b, the driving pulse φV1 applied to the terminal 113, the driving pulse φV2 applied to the terminal 116, the driving pulse φV3 applied to the terminal 115, and the driving pulse φV4 applied to the terminal 114. The interval of the vertical synchronizing signal VD is set as one field.

As shown in FIG. 5, during a period when the mechanical shutter 1b is closed, in synchronization with the vertical synchronizing signal VD, the driving pulse φV1 on which the read pulse (the portion indicated by the thick line) is superimposed is applied to the terminal 113, and the driving pulse φV2 on which the read pulse is superimposed is applied to the terminal 116. As a result, charges from the first charge reading regions 107 and the second charge reading regions 108 of odd rows are read out into the vertical transfer channels. As shown in FIG. 4, then, the driving pulses are repeatedly applied to the terminals 113 to 116 to transfer the read-out charges in the column direction. In the horizontal transfer portion 111, the charges which are read out from the first and second photoelectric conversion elements 101 and 102 of odd rows are transferred one row at a time to the output portion 112.

In synchronization with the next vertical synchronizing signal VD, the driving pulse φV3 on which the read pulse is superimposed is applied to the terminal 115, and the driving pulse φV4 on which the read pulse is superimposed is applied to the terminal 114. As a result, charges from the first charge reading regions 107 and the second charge reading regions 108 of even rows are read out into the vertical transfer channels. As shown in FIG. 4, then, the driving pulses are repeatedly applied to the terminals 113 to 116 to transfer the read-out charges in the column direction. In the horizontal transfer portion 111, the charges which are read out from the first and second photoelectric conversion elements 101 and 102 of even rows are transferred one row at a time to the output portion 112.

In the solid-state imaging device 100, therefore, charges can be read out in two separate steps respectively for the odd rows and the even rows.

(3) Readout of Charges from First Photoelectric Conversion Elements 101

Figure 6:
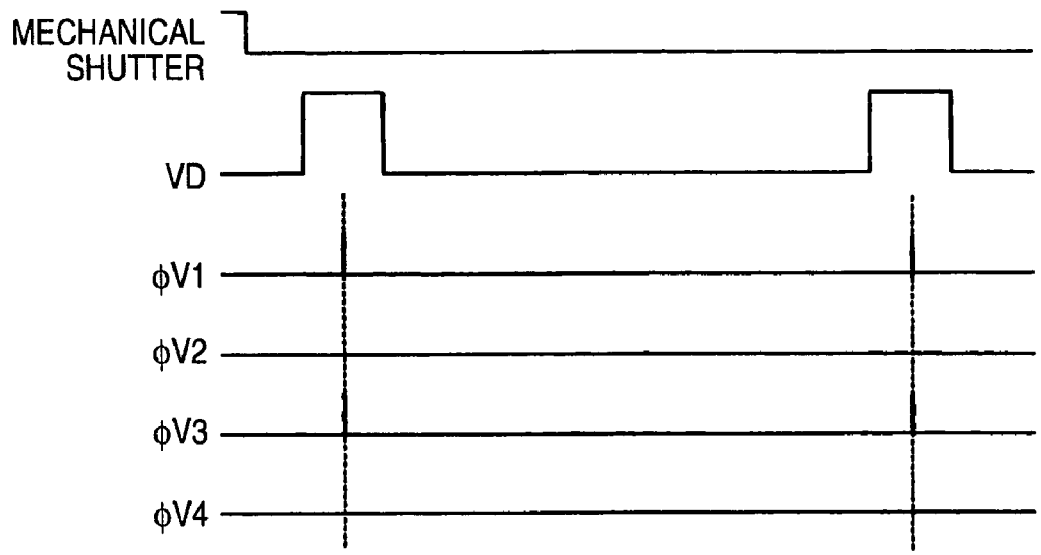
FIG. 6 is a timing chart illustrating a method of driving the solid-state imaging device illustrating the first embodiment of the invention.

FIG. 6 is a timing chart illustrating driving method (3) for the solid-state imaging device 100. FIG. 6 shows the vertical synchronizing signal VD, the opening/closing state of the mechanical shutter 1b, the driving pulse φV1 applied to the terminal 113, the driving pulse φV2 applied to the terminal 116, the driving pulse φV3 applied to the terminal 115, and the driving pulse φV4 applied to the terminal 114. The interval of the vertical synchronizing signal VD is set as one field.

As shown in FIG. 6, during a period when the mechanical shutter 1b is closed, in synchronization with the vertical synchronizing signal VD, the driving pulse φV1 on which the read pulse (the portion indicated by the thick line) is superimposed is applied to the terminal 113, and the driving pulse φV3 on which the read pulse is superimposed is applied to the terminal 115. As a result, charges from the first charge reading regions 107 are read out into the vertical transfer channels. As shown in FIG. 4, then, the driving pulses are repeatedly applied to the terminals 113 to 116 to transfer the read-out charges in the column direction. In the horizontal transfer portion 111, the charges which are read out from the first photoelectric conversion elements 101 of one row are transferred at any time to the output portion 112. In synchronization with the next vertical synchronizing signal VD, then, the same control as above is repeated.

In the solid-state imaging device 100, therefore, the readout of only charges from the first photoelectric conversion elements 101 can be conducted. In a process of imaging a motion picture or the like, consequently, motion picture imaging can be conducted at a high speed by the above-described control while keeping the mechanical shutter open.

(4) Mixture Readout

Figure 7:
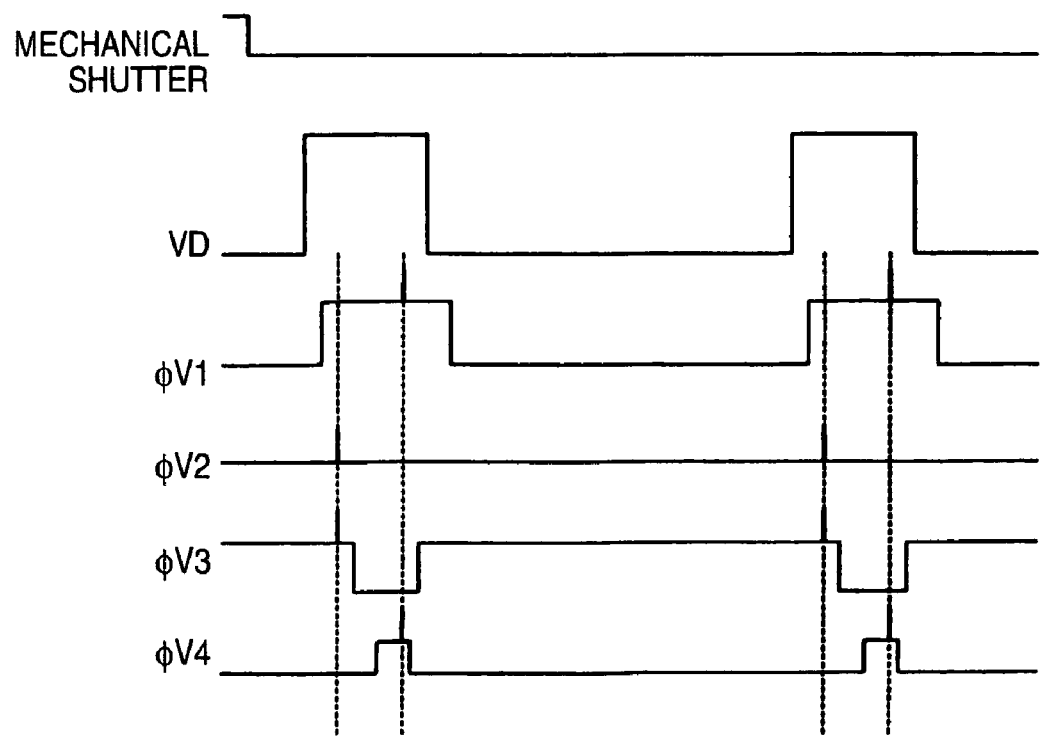
FIG. 7 is a timing chart illustrating a method of driving the solid-state imaging device illustrating the first embodiment of the invention.

FIG. 7 is a timing chart illustrating driving method (4) for the solid-state imaging device 100. FIG. 7 shows the vertical synchronizing signal VD, the opening/closing state of the mechanical shutter 1b, the driving pulse φV1 applied to the terminal 113, the driving pulse φV2 applied to the terminal 116, the driving pulse φV3 applied to the terminal 115, and the driving pulse φV4 applied to the terminal 114. The interval of the vertical synchronizing signal VD is set as one field.

As shown in FIG. 7, during a period when the mechanical shutter 1b is closed, in synchronization with the vertical synchronizing signal VD, the driving pulse φV2 on which the read pulse (the portion indicated by the thick line) is superimposed is applied to the terminal 116, and the driving pulse φV3 on which the read pulse is superimposed is applied to the terminal 115. As a result, charges from each of two regions or the first charge reading region 107 and the second charge reading region 108 which are adjacent to each other in the column direction in photoelectric conversion elements of even rows are read out into the vertical transfer channels with being mixed with each other. In synchronization with the vertical synchronizing signal VD of the same timing, then, the driving pulse φV1 on which the read pulse is superimposed is applied to the terminal 113, and the driving pulse φV4 on which the read pulse is superimposed is applied to the terminal 114. As a result, charges from each of two regions or the first charge reading region 107 and the second charge reading region 108 which are adjacent to each other in the column direction in photoelectric conversion elements of odd rows are read out into the vertical transfer channels with being mixed with each other. As shown in FIG. 4, then, the driving pulses are repeatedly applied to the terminals 113 to 116 to transfer the read-out charges in the column direction. In the horizontal transfer portion 111, the charges which are read out from the first charge reading regions 107 and the second charge reading regions 108 of one row are transferred at any time to the output portion 112. In synchronization with the next vertical synchronizing signal VD, then, the same control as above is repeated.

In the solid-state imaging device 100, therefore, charges of each of the first charge reading regions 107 and the second charge reading regions 108 can be read out with being mixed with each other.

Figure 8:
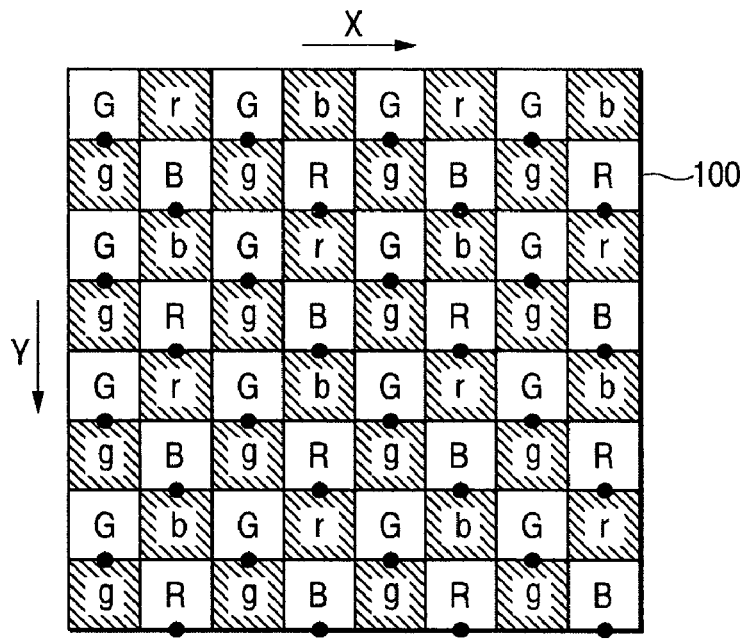
FIG. 8 is a diagram schematically showing an arrangement of photoelectric conversion elements of the solid-state imaging device illustrating the first embodiment of the invention.

FIG. 8 is a diagram schematically showing the arrangement of the photoelectric conversion elements of the solid-state imaging device 100 of the invention. Although 8×8 photoelectric conversion elements are shown in FIG. 8 for the sake of simplicity, an actual solid-state imaging device have a larger number of photoelectric conversion elements. In the solid-state imaging device 100 of FIG. 8, color filters are arranged above the photoelectric conversion elements. Each of the color filters has a spectral sensitivity of red (hereinafter, often referred to merely as "R" or "r"), green (hereinafter, often referred to merely as "G" or "g"), or blue (hereinafter, often referred to merely as "B" or "b"). In the following description, the region of one photoelectric conversion element in FIG. 8 is referred to as one pixel.

The first photoelectric conversion elements 101 (in FIG. 8, denoted by one of reference letters R, G, and B) which are arranged in a checkered pattern have a spectral sensitivity of one of the three colors red, green, and blue. The color coding arrangement is formed as an arrangement of a 2×2 period in a square lattice as viewed in an oblique or 45 degree direction. The second photoelectric conversion elements 102 (in FIG. 8, denoted by one of reference letters r, g, and b, and shaded) which are similarly arranged in a checkered pattern have a spectral sensitivity of one of the three colors red, green, and blue. The color coding arrangement is formed as an arrangement of a 2×2 period in a square lattice as viewed in an oblique or 45-degree direction. For example, the arrangement of a 2×2 period is a Beyer arrangement as shown in FIG. 8.

As seen from FIG. 8, the color coding arrangement of the first photoelectric conversion elements 101 is shifted from that of the second photoelectric conversion elements 102, by one pixel in the longitudinal direction. Namely, the first photoelectric conversion elements 101, and the second photoelectric conversion elements 102 which are adjacent thereto downward in the longitudinal direction (Y direction) have a constant sensitivity ratio, and the same relative spectral sensitivity characteristics. The color coding arrangement of the first photoelectric conversion elements 101 may be shifted from that of the second photoelectric conversion elements 102, by one pixel in the lateral direction (X direction).

In the solid-state imaging device of FIG. 8, the color filters of the primary colors are used. Alternatively, color filters of complementary colors may be used. In the alternative, color filters of four colors or green, yellow, cyan, and magenta are used. In the solid-state imaging device of FIG. 8, in order to obtain a color picked-up image, photoelectric conversion elements of different spectral sensitivity characteristics are arranged. In the case where color photography is not required, it is sufficient to set all the photoelectric conversion elements to have the same relative spectral sensitivity characteristics.

Next, the function of the digital signal processing section 6 will be described with placing emphasis on the image combining process.

Figure 9:
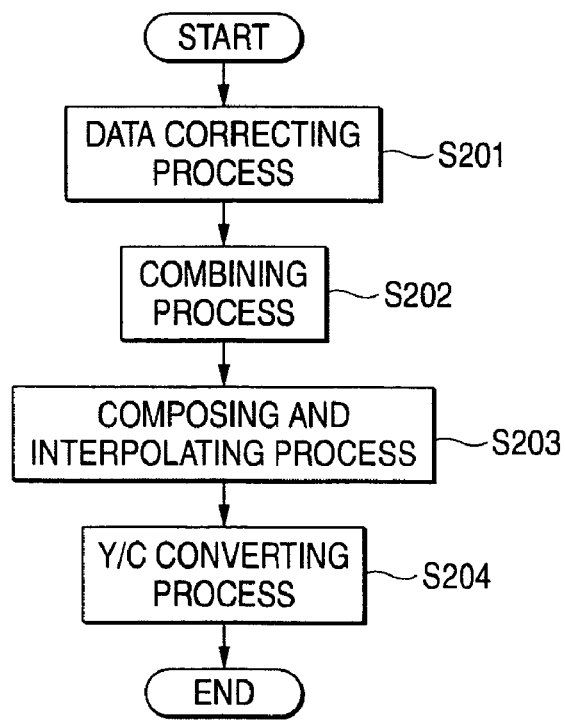
FIG. 9 is a view schematically showing the operation flow of a digital signal processing section of the digital camera illustrating the first embodiment of the invention.

FIG. 9 is a view schematically showing an example of the operation flow of the digital signal processing section 6.

In step S201, a process of correcting the RAW image data supplied from the A/D converter 3 is conducted. The correcting process includes the OB process, the linear matrix correcting process, the white balance adjusting process, the gamma correcting process, and the like. The RAW image data are sequentially output from the A/D converter 3 for the signals of all the photoelectric conversion elements of the solid-state imaging device 100. In the case of the arrangement of FIG. 8, specifically, signals of GrGbGrGb for the pixels of the first row are output, those of gBgRgBgR of the second row are then output, and those of the third to eighth rows are thereafter sequentially output.

In step S202, the combining process is conducted with using image data which have undergone the correcting process. In the combining process, image data based on charges from the first and second photoelectric conversion elements 101 and 102 which have the same relative spectral sensitivity characteristics, and which are adjacent to each other in the same positional relationships are combined with each other. In the solid-state imaging device 100, the first photoelectric conversion elements 101, and the second photoelectric conversion elements 102 which are adjacent thereto downward in the longitudinal direction (Y direction) as shown in FIG. 8 have the same relative spectral sensitivity characteristics. Therefore, image data obtained from pixels which are adjacent to each other in the longitudinal direction are combined with each other. An example of the combining method is indicated by Expression (a) below.

$$Sc = \alpha S_H + (1-\alpha) S_L \quad (a)$$

where Sc is a combined signal, and, in the case of a color image, is a red combined signal Rc, a green combined signal Gc, or a blue combined signal Bc, $S_H$ and $S_L$ are image signals obtained from the first and second photoelectric conversion elements 101 and 102, and, in the case of a color image, are red image signals R and r, green image signals G and g, or blue image signal B and b, and $\alpha$ is a coefficient for determining the combination ratio and set to $0 < \alpha < 1$. Although depending on the imaging scene, a preferred value of $\alpha$ is in the range of 0.5 to 0.8.

In the case of the pixel arrangement of FIG. 8, image signals obtained from the first and second photoelectric conversion elements 101 and 102 which are adjacent to each other downward in the longitudinal direction are combined with each other. Therefore, the combined signals Rc, Gc, Bc virtually indicate picked-up signals at the positions of dots "•" in FIG. 8. For the sake of convenience, each of the dots "•" is indicated at an intermediate between the first and second photoelectric conversion elements 101 and 102. Actually, however, the dot is at the center of gravity of the two pixels. As shown in FIG. 10, therefore, the combined signals Rc, Gc, Bc indicate image signals at checkered pattern positions. In FIG. 10, white hollow circles "O" indicate lattice positions from which an image signal is not obtained.

The combining calculation uses image data of two adjacent rows, and hence can be conducted in real time while inputting data from the A/D converter 3. In the case where charges are to be read out by above-described driving method (2), image signals of all the pixels are once stored into the internal memory 10 or the like, and the combining process is then conducted.

When image signals at checkered pattern positions such as shown in FIG. 10 are obtained, a composing and interpolating process is conducted in step S203. Namely, for an pixel from which only one of red, green, and blue signals is obtained, the other color signals are obtained, and an image signal is obtained at a position of a hollow circle "O" from which an image signal is not obtained, thereby obtaining RGB signals of all the lattice positions. Various methods of specific calculations in the composing and interpolating process have been proposed, and hence their description will be omitted.

When RGB signals at all the lattice positions are obtained, a Y/C converting process is conducted in step S204. In the Y/C converting process, RGB data are converted to Y/C data. The obtained Y/C data are sent to the compression/decompression processing section 7.

The image data which are obtained as a result of the above-described process are based on the combined image data at checkered pattern positions as shown in FIG. 10. Therefore, the resolutions in the longitudinal and lateral directions are not substantially reduced. Moreover, the size of the first photoelectric conversion elements 101 is not set to be equal to that of the second photoelectric conversion elements 102, but made larger. Therefore, the SN ratio of the image signals obtained from the first photoelectric conversion elements 101 can be improved. Consequently, the digital camera 200 can produce image data in which the image quality is less lowered.

In the above description, the first charge reading regions 107 are disposed at positions corresponding to the vertical transfer electrodes 103 and 105, and the second charge reading regions 108 are disposed at positions corresponding to the vertical transfer electrodes 104 and 106. Alternatively, both the first charge reading regions 107 and the second charge reading regions 108 may be disposed at positions corresponding to the vertical transfer electrodes 103 and 105. In the alternative, reading out of charges from each of the first charge reading regions 107 and the second charge reading regions 108 is conducted by superimposing the read pulse on the first-phase vertical transfer pulse applied to the terminal 113, and the third-phase vertical transfer pulse applied to the terminal 115. In this case, the solid-state imaging device 100 may be driven by either of following methods (5) and (6).

(5) Line Readout

Figure 11:
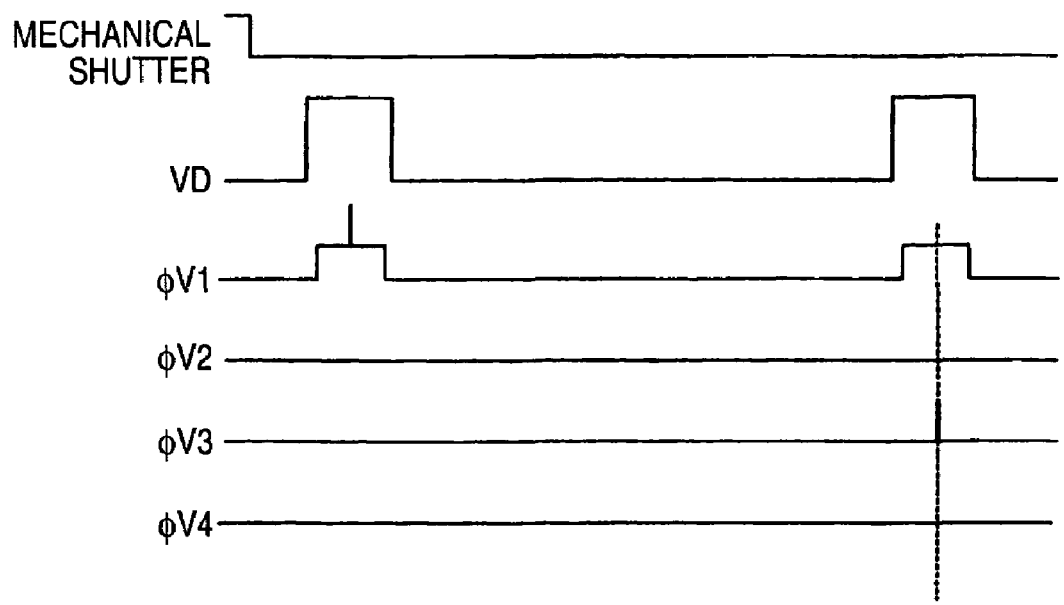
FIG. 11 is a timing-chart illustrating a method of driving the solid-state imaging device illustrating the first embodiment of the invention.

FIG. 11 is a timing chart illustrating driving method (5) for the solid-state imaging device 100. FIG. 11 shows the vertical synchronizing signal VD, the opening/closing state of the mechanical shutter 1b, the driving pulse φV1 applied to the terminal 113, the driving pulse φV2 applied to the terminal 116, the driving pulse φV3 applied to the terminal 115, and the driving pulse φV4 applied to the terminal 114. The interval of the vertical synchronizing signal VD is set as one field.

As shown in FIG. 11, during a period when the mechanical shutter 1b is closed, in synchronization with the vertical synchronizing signal VD, the driving pulse φV1 on which the read pulse (the portion indicated by the thick line) is superimposed is applied to the terminal 113. As a result, charges from each of the first charge reading regions 107 and the second charge reading regions 108 are read out into the vertical transfer channels. As shown in FIG. 4, then, the driving pulses are repeatedly applied to the terminals 113 to 116 to transfer the read-out charges in the column direction. In the horizontal transfer portion 111, the charges which are read out from the first and second photoelectric conversion elements 101 and 102 of odd rows are transferred one row at a time to the output portion 112.

In synchronization with the next vertical synchronizing signal VD, the driving pulse φV3 on which the read pulse is superimposed is applied to the terminal 115. As a result, charges from each of the first charge reading regions 107 and the second charge reading regions 108 are read out into the vertical transfer channels. As shown in FIG. 4, then, the driving pulses are repeatedly applied to the terminals 113 to 116 to transfer the read-out charges in the column direction. In the horizontal transfer portion 111, the charges which are read out from the first and second photoelectric conversion elements 101 and 102 of even rows are transferred one row at a time to the output portion 112.

(6) Mixture Readout

Figure 12:
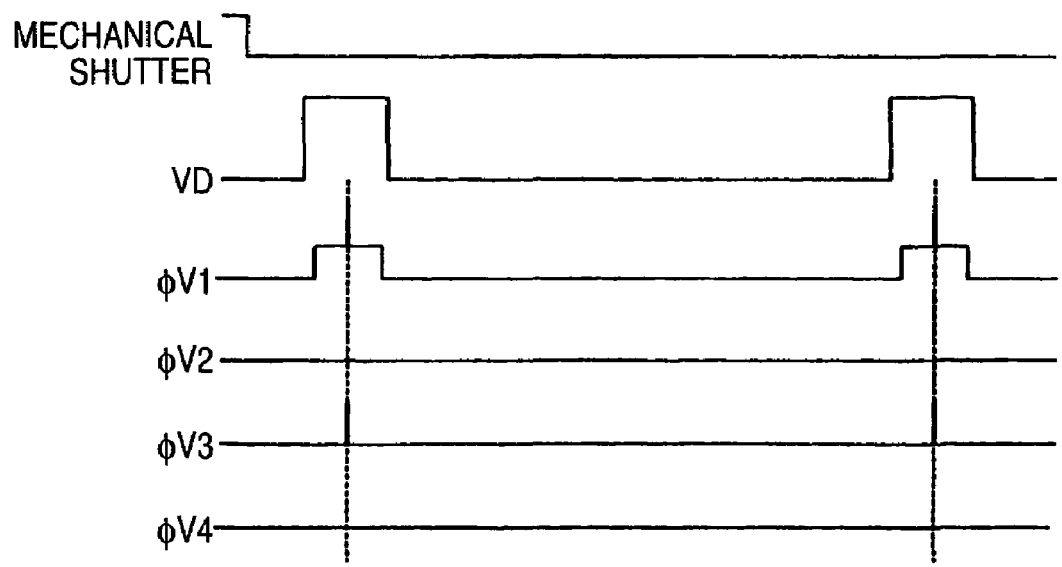
FIG. 12 is a timing chart illustrating a method of driving the solid-state imaging device illustrating the first embodiment of the invention.

FIG. 12 is a timing chart illustrating driving method (6) for the solid-state imaging device 100. FIG. 12 shows the vertical synchronizing signal VD, the opening/closing state of the mechanical shutter 1b, the driving pulse φV1 applied to the terminal 113, the driving pulse φV2 applied to the terminal 116, the driving pulse φV3 applied to the terminal 115, and the driving pulse φV4 applied to the terminal 114. The interval of the vertical synchronizing signal VD is set as one field.

As shown in FIG. 12, during a period when the mechanical shutter 1b is closed, in synchronization with the vertical synchronizing signal VD, the driving pulse φV1 on which the read pulse (the portion indicated by the thick line) is superimposed is applied to the terminal 113, and the driving pulse φV3 on which the read pulse is superimposed is applied to the terminal 115. As a result, charges from each of the first charge reading region 107 and the second charge reading region 108 which are adjacent to each other in the column direction are read out into the vertical transfer channels with being mixed with each other. As shown in FIG. 4, then, the driving pulses are repeatedly applied to the terminals 113 to 116 to transfer the read-out charges in the column direction. In the horizontal transfer portion 111, the charges which are read out from the first photoelectric conversion elements 101 of one row are transferred at any time to the output portion 112. In synchronization with the next vertical synchronizing signal VD, then, the same control as above is repeated.

SECOND EMBODIMENT

Figure 13:
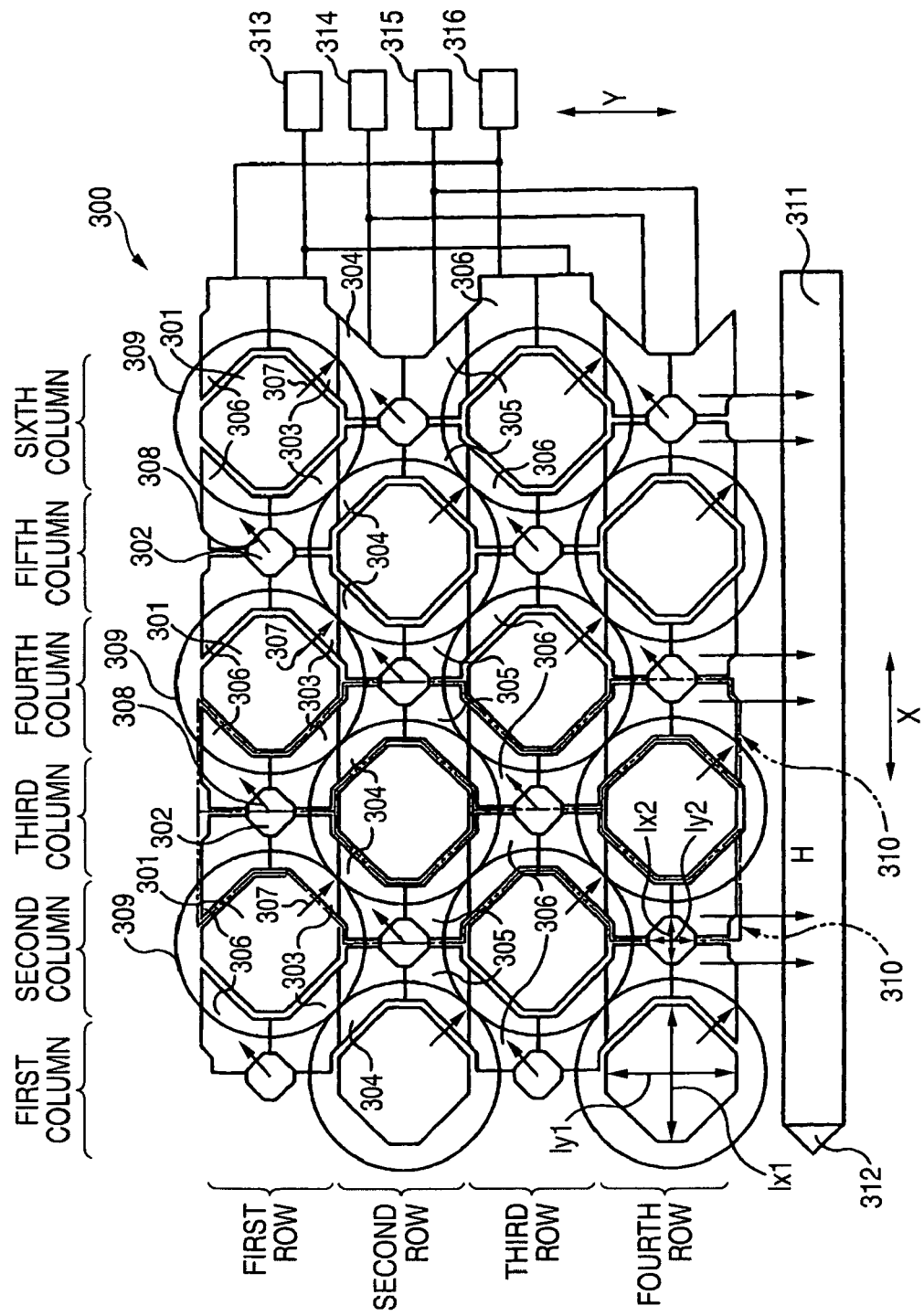
FIG. 13 is a view schematically showing the configuration of a solid-state imaging device illustrating a second embodiment of the invention.

FIG. 13 is a view schematically showing the configuration of a solid-state imaging device illustrating a second embodiment of the invention. FIG. 13 is a partial enlarged view of the solid-state imaging device 300.

The solid-state imaging device 300 includes: plural first photoelectric conversion elements 301 and second photoelectric conversion elements 302 (hereinafter, often referred to merely as photoelectric conversion elements) which are arranged in a square lattice on a surface of a semiconductor substrate in a row direction (the direction X in FIG. 13) and a column direction (the direction Y in FIG. 13) that is perpendicular to the row direction; vertical transfer portions 310 which are disposed to respectively correspond to plural photoelectric conversion element columns each configured by the photoelectric conversion elements that are arranged in the column direction, and which transfer charges from the photoelectric conversion elements in the column direction; a horizontal transfer portion 311 which transfers charges transferred by the vertical transfer portions 310, in the row direction; an output portion 312 which outputs a signal corresponding to charges transferred by the horizontal transfer portion 311; and plural microlenses 309 which are disposed above the first photoelectric conversion elements 301. For example, the first photoelectric conversion elements 301 and the second photoelectric conversion elements 302 are photodiodes.

The first photoelectric conversion elements 301 conduct photoelectric conversion of a relatively higher sensitivity on the amount of light which is incident on the solid-state imaging device 300, and are arranged in a checkered pattern. The second photoelectric conversion elements 302 conduct photoelectric conversion of a relatively lower sensitivity on the amount of light which is incident on the solid-state imaging device 300, and are arranged in a checkered pattern. Each of the first and second photoelectric conversion elements 301 and 302 has an octagonal shape. However, the shapes of the elements are not particularly restricted to this. The sensitivity of each of the first and second photoelectric conversion elements 301 and 302 can be changed by changing the area of the light receiving surface of the photoelectric conversion element, or by changing the light collecting area by means of the microlens disposed above the photoelectric conversion element. These methods are well known, and hence their description is omitted.

The first photoelectric conversion elements 301 are larger in size than the second photoelectric conversion elements 302. The device is designed so that, as shown in FIG. 13, the length lx1 in the row direction of each of the first photoelectric conversion elements 301 with respect to the center of the element is longer than the length lx2 in the row direction of each of the second photoelectric conversion elements 302 with respect to the center of the element, and the length ly1 in the column direction of each of the first photoelectric conversion elements 301 with respect to the center of the element is longer than the length ly2 in the column direction of each of the second photoelectric conversion elements 302 with respect to the center of the element. In the case where the sensitivity of the first photoelectric conversion elements 301 is set to be higher than that of the second photoelectric conversion elements 302, no problem occurs even when the charge accumulation capacity of the second photoelectric conversion elements 302 is sufficiently smaller than that of the first photoelectric conversion elements 301. In the embodiment, as shown in FIG. 13, the size of the first photoelectric conversion elements 301 is lager than that of the second photoelectric conversion elements 302, so that the charge accumulation capacity of the first photoelectric conversion elements 301 is made larger and that of the second photoelectric conversion elements 302 is made smaller. Therefore, the SN ratio of the image signals obtained from the first photoelectric conversion elements 301 can be improved, and the image quality can be enhanced.

The vertical transfer portions 310 include: plural vertical transfer channels (not shown) which are formed in the column direction on the semiconductor substrate to respectively correspond to the photoelectric conversion element columns each configured by plural photoelectric conversion elements arranged in the column direction; plural vertical transfer electrodes 303 to 306 (in FIG. 13, only a part of the vertical transfer electrodes are designated by the reference numerals) which are formed above the vertical transfer channels; and first charge reading regions 307 and second charge reading regions 308 (in FIG. 13, the regions are diagrammatically indicated by the arrows) which read out charges from the first and second photoelectric conversion elements 301 and 302 to the vertical transfer channels. Each of the vertical transfer electrodes 303 to 306 has a meandering shape which elongates in the row direction as a whole between the first and second photoelectric conversion elements 301 and 302.

The vertical transfer channels are meandering regions which elongate in the column direction as a whole between the photoelectric conversion element columns. The regions into which charges are to be accumulated, and along which the accumulated charges are to be transferred are defined by the vertical transfer electrodes 303 to 306 which are formed above the regions. The vertical transfer electrodes 303 to 306 are disposed so that two of the electrodes correspond to each of the first and second photoelectric conversion elements 301 and 302. Four-phase vertical transfer pulses (hereinafter, referred to also as driving pulses) are applied to the vertical transfer electrodes 303 to 306 via terminals 313 to 316, so that charges in the vertical transfer channels are transferred in the column direction. Alternatively, the vertical transfer electrodes 303 to 306 may be disposed so that two or more of the electrodes correspond to each of the first and second photoelectric conversion elements 301 and 302.

The first charge reading regions 307 are disposed at positions corresponding to the vertical transfer electrodes 303 and 305, and the second charge reading regions 308 are disposed at positions corresponding to the vertical transfer electrodes 304 and 306. The operation of reading out charges from the first photoelectric conversion elements 301 to the vertical transfer channels is conducted by superimposing a read pulse on the first-phase vertical transfer pulse applied to the terminal 313, and also on the third-phase vertical transfer pulse applied to the terminal 315. The operation of reading out charges from the second photoelectric conversion elements 302 to the vertical transfer channels is conducted by superimposing a read pulse on the fourth-phase vertical transfer pulse applied to the terminal 314, and also on the second-phase vertical transfer pulse applied to the terminal 316.

In FIG. 13, sets of plural photoelectric conversion elements which are arranged in the row direction (X direction) are formed as photoelectric conversion element rows, and their identifications (first row, second row, third row, and fourth row) are indicated on the sides of the rows. Moreover, sets of plural photoelectric conversion elements which are arranged in the column direction (Y direction) are formed as photoelectric conversion element columns, and their identifications (first column, second column, third column, fourth column, fifth column, and sixth column) are indicated above the columns. In the solid-state imaging device 300, a large number of the photoelectric conversion element rows and photoelectric conversion element columns are formed on the semiconductor substrate.

Figure 14:
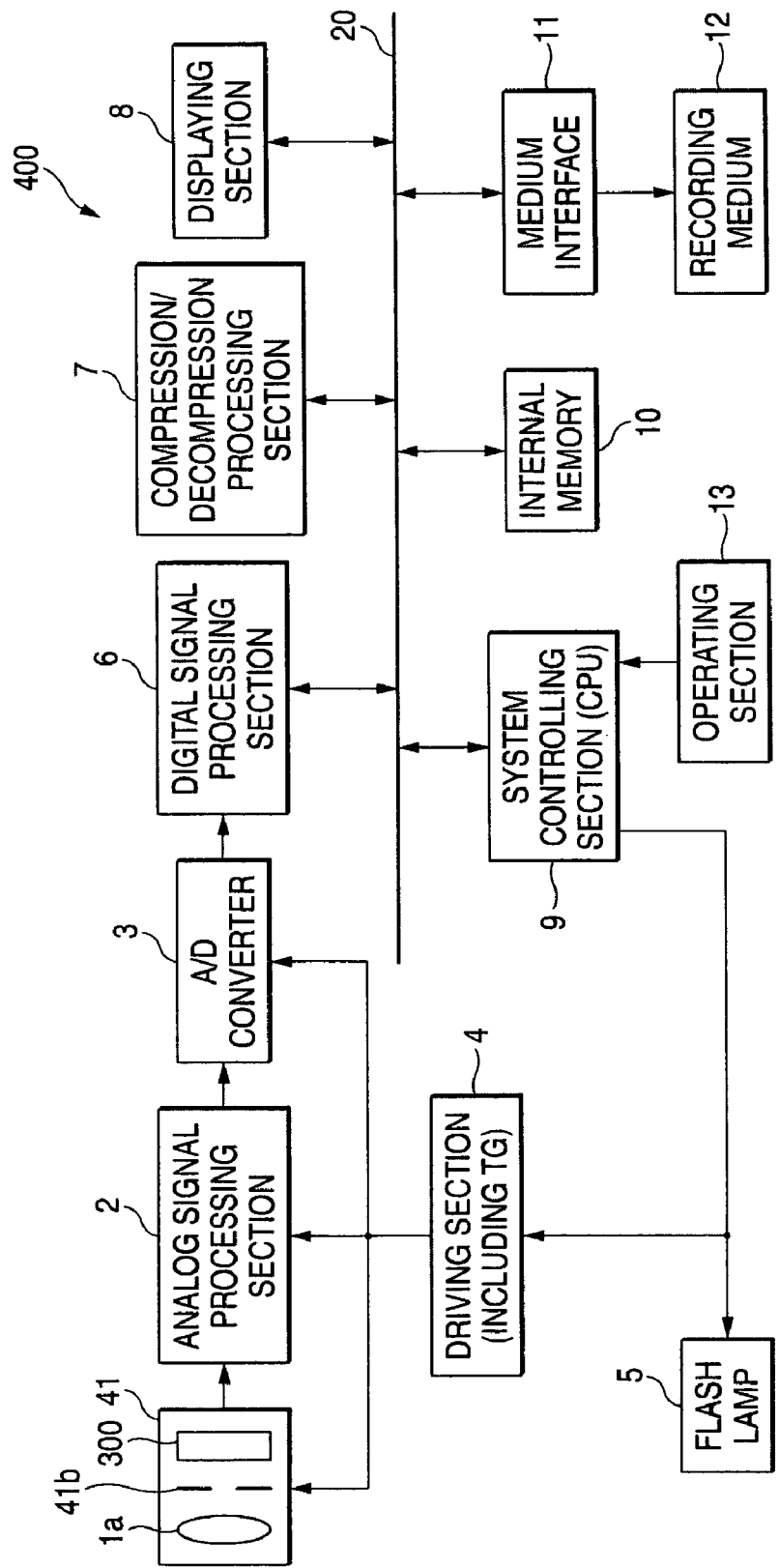
FIG. 14 is a diagram schematically showing the configuration of a digital camera illustrating the second embodiment of the invention.

FIG. 14 is a diagram schematically showing the configuration of a digital camera 400 illustrating an embodiment of the invention. Description will be made while the components identical with those of FIG. 2 are denoted by the same reference numerals.

The digital camera 400 comprises an imaging section 41, an analog signal processing section 2, an A/D converter 3, a driving section 4, a flash lamp 5, a digital signal processing section 6, a compression/decompression processing section 7, a displaying section 8, a system controlling section 9, an internal memory 10, a medium interface 11, a recording medium 12, and an operating section 13. The digital signal processing section 6, the compression/decompression processing section 7, the displaying section 8, the system controlling section 9, the internal memory 10, and the medium interface 11 are connected to a system bus 20.

The imaging section 41 includes an imaging optical system 1a such as an imaging lens, a mechanical shutter 41b, and the solid-state imaging device 300 shown in FIG. 13. The imaging section takes an image of an object, and outputs an analog picked-up signal.

Hereinafter, the driving of the solid-state imaging device 300 will be described. The solid-state imaging device 300 can be driven by methods (7) to (10) below. The methods will be described with reference to FIGS. 3 to 7.

(7) Independent Readout

As shown in FIG. 3, during a period when the mechanical shutter 41b is closed, in synchronization with the vertical synchronizing signal VD, the driving pulse φV1 on which the read pulse is superimposed is applied to the terminal 313, and the driving pulse φV3 on which the read pulse is superimposed is applied to the terminal 315. As a result, charges from the first charge reading regions 307 are read out into the vertical transfer channels. As shown in FIG. 4, then, the driving pulses are repeatedly applied to the terminals 313 to 316 to transfer the read-out charges in the column direction. In the horizontal transfer portion 311, the charges which are read out from the first photoelectric conversion elements 301 of one row are transferred at any time to the output portion 312.

In synchronization with the next vertical synchronizing signal VD, the driving pulse φV2 on which the read pulse is superimposed is applied to the terminal 316, and the driving pulse φV4 on which the read pulse is superimposed is applied to the terminal 314. As a result, charges from the second charge reading regions 308 are read out into the vertical transfer channels. As shown in FIG. 4, then, the driving pulses are repeatedly applied to the terminals 313 to 316 to transfer the read-out charges in the column direction. In the horizontal transfer portion 311, the charges which are read out from the second photoelectric conversion elements 302 of one row are transferred at any time to the output portion 312.

In the solid-state imaging device 300, therefore, charges from the first photoelectric conversion elements 301, and those from the second photoelectric conversion elements 302 can be independently read out.

(8) Line Readout

As shown in FIG. 5, during a period when the mechanical shutter 41b is closed, in synchronization with the vertical synchronizing signal VD, the driving pulse φV1 on which the read pulse is superimposed is applied to the terminal 313, and the driving pulse φV2 on which the read pulse is superimposed is applied to the terminal 316. As a result, charges from the first charge reading regions 307 and the second charge reading regions 308 of odd rows are read out into the vertical transfer channels. As shown in FIG. 4, then, the driving pulses are repeatedly applied to the terminals 313 to 316 to transfer the read-out charges in the column direction. In the horizontal transfer portion 311, the charges which are read out from the first and second photoelectric conversion elements 301 and 302 of odd rows are transferred one row at a time to the output portion 312.

In synchronization with the next vertical synchronizing signal VD, the driving pulse φV3 on which the read pulse is superimposed is applied to the terminal 315, and the driving pulse φV4 on which the read pulse is superimposed is applied to the terminal 314. As a result, charges from the first charge reading regions 307 and the second charge reading regions 308 of even rows are read out into the vertical transfer channels. As shown in FIG. 4, then, the driving pulses are repeatedly applied to the terminals 313 to 316 to transfer the read-out charges in the column direction. In the horizontal transfer portion 311, the charges which are read out from the first and second photoelectric conversion elements 301 and 302 of even rows are transferred one row at a time to the output portion 312.

In the solid-state imaging device 300, therefore, charges can be read out in two separate steps respectively for the odd rows and the even rows.

(9) Readout of Charges from First Photoelectric Conversion Elements 301

As shown in FIG. 6, during a period when the mechanical shutter 41b is closed, in synchronization with the vertical synchronizing signal VD, the driving pulse φV1 on which the read pulse is superimposed is applied to the terminal 313, and the driving pulse φV3 on which the read pulse is superimposed is applied to the terminal 315. As a result, charges from the first charge reading regions 307 are read out into the vertical transfer channels. As shown in FIG. 4, then, the driving pulses are repeatedly applied to the terminals 313 to 316 to transfer the read-out charges in the column direction. In the horizontal transfer portion 311, the charges which are read out from the first photoelectric conversion elements 301 of one row are transferred at any time to the output portion 312. In synchronization with the next vertical synchronizing signal VD, then, the same control as above is repeated.

In the solid-state imaging device 300, therefore, the readout of only charges from the first photoelectric conversion elements 301 can be conducted out. In a process of imaging a motion picture or the like, consequently, motion picture imaging can be conducted at a high speed by the above-described control while keeping the mechanical shutter open.

(10) Mixture Readout

As shown in FIG. 7, during a period when the mechanical shutter 41b is closed, in synchronization with the vertical synchronizing signal VD, the driving pulse φV2 on which the read pulse is superimposed is applied to the terminal 316, and the driving pulse φV3 on which the read pulse is superimposed is applied to the terminal 315. As a result, charges from each of the first charge reading region 307 and the second charge reading region 308 which are adjacent to each other in the column direction in photoelectric conversion elements of odd rows are read out into the vertical transfer channels with being mixed with each other. In synchronization with the vertical synchronizing signal VD of the same timing, then, the driving pulse φV1 on which the read pulse is superimposed is applied to the terminal 313, and the driving pulse φV4 on which the read pulse is superimposed is applied to the terminal 314. As a result, charges from each of the first charge reading region 307 and the second charge reading region 308 which are adjacent to each other in the column direction in photoelectric conversion elements of even rows are read out into the vertical transfer channels with being mixed with each other. As shown in FIG. 4, then, the driving pulses are repeatedly applied to the terminals 313 to 316 to transfer the read-out charges in the column direction. In the horizontal transfer portion 311, the charges which are read out from the first photoelectric conversion elements 301 of one row are transferred at any time to the output portion 312. In synchronization with the next vertical synchronizing signal VD, then, the same control as above is repeated.

In the solid-state imaging device 300, therefore, charges of each of the first charge reading regions 307 and the second charge reading regions 308 can be read out with being mixed with each other.

The digital signal processing section 6 operates in the same manner as that of the first embodiment except that the first and second photoelectric conversion elements 101 and 102 of FIG. 1 are replaced with the first and second photoelectric conversion elements 301 and 302.

Also the solid-state imaging device 300 may be configured so that both the first charge reading regions 307 and the second charge reading regions 308 are disposed at positions corresponding to the vertical transfer electrodes 303 and 305. In this case, the driving method is identical with that shown in FIGS. 11 and 12.

According to the invention, it is possible to provide a solid-state imaging device in which the dynamic range can be expanded without lowering the resolution.

The entire disclosure of each and every foreign patent application from which the benefit of foreign priority has been claimed in the present application is incorporated herein by reference, as if fully set forth.

What is claimed is:

1. A solid-state imaging device comprising:
   a semiconductor substrate;
   a plurality of photoelectric conversion elements forming a square lattice pattern extending in a column direction and in a row direction substantially perpendicular to the row direction, on a surface of the semiconductor substrate; and
   a plurality of color filters formed on said plurality of photoelectric conversion elements,
   wherein said plurality of photoelectric conversion elements comprises:
      a plurality of first photoelectric conversion elements that conduct photoelectric conversion of a relatively higher sensitivity on an amount of incident light; and
      a plurality of second photoelectric conversion elements that conduct photoelectric conversion of a relatively lower sensitivity on the amount of incident light,
   wherein said plurality of first photoelectric conversion elements and said plurality of second photoelectric conversion elements are alternately arranged in said column direction and said row direction,
   wherein said plurality of first photoelectric conversion elements are larger in size than said plurality of second photoelectric conversion elements such that said plurality of first photoelectric conversion elements have a charge accumulation capacity that is greater than a charge accumulation capacity of said plurality of second photoelectric conversion elements,
   wherein the first photoelectric conversion elements have a length in a column direction which is greater than a length of the second photoelectric conversion elements in the column direction, and a length in a row direction which is substantially equal to a length of the second photoelectric conversion elements in the row direction,
   wherein said plurality of photoelectric conversion elements comprises plural pairs of photoelectric conversion elements comprising:
      a first photoelectric conversion element of said plurality of first photoelectric conversion elements having a green color filter of said plurality of color filters; and
      a second photoelectric conversion element of said plurality of second photoelectric conversion elements, which is adjacent to said first photoelectric conversion element in the column direction and has a green color filter of said plurality of color filters, and wherein said plurality of photoelectric conversion elements comprises plural sets of photoelectric conversion elements comprising:
- a third photoelectric conversion element of said plurality of first photoelectric conversion elements having a red color filter of said plurality of color filters;
- a fourth photoelectric conversion element of said plurality of second photoelectric conversion elements, which is adjacent to said third photoelectric conversion element in the column direction and has a red color filter of said plurality of color filters; and
- a fifth photoelectric conversion element of said plurality of second photoelectric conversion elements, which is adjacent to said third photoelectric conversion element in a direction opposite to the column direction and has a blue color filter of said plurality of color filters.

2. A solid-state imaging device according to claim 1, wherein the square lattice pattern comprises a plurality of sets, each comprising a subset of the photoelectric conversion elements arranged in one of the column direction and the row direction, wherein the solid-state imaging device further comprises:
- a plurality of vertical transfer portions that transfer charges from said plurality of photoelectric conversion elements in the column direction, each of said plurality of vertical transfer portions corresponding to each of the subsets of the photoelectric conversion elements arranged in the column direction;
- a horizontal transfer portion that transfers charges transferred by the vertical transfer portions, in the row direction; and
- an output portion that outputs a signal corresponding to charges transferred by the horizontal transfer portion, wherein said plurality of vertical transfer portions comprises:
- a plurality of vertical transfer channels arranged in the column direction in the semiconductor substrate, each of the vertical transfer channels corresponding to each of the subsets of the photoelectric conversion elements arranged in the column direction;
- a plurality of vertical transfer electrodes arranged to substantially cross the vertical transfer channels when viewed from a vertical direction to a plane of the semiconductor substrate; and
- a plurality of charge reading regions that reads out charges from the photoelectric conversion elements to the vertical transfer channels, wherein each of the photoelectric conversion elements corresponds to one of the vertical transfer electrodes, wherein said plurality of charge reading regions comprises:
- a plurality of first charge reading regions corresponding to said plurality of first photoelectric conversion elements; and
- a plurality of second charge reading regions corresponding to said plurality of second photoelectric conversion elements, and wherein said plurality of vertical transfer electrodes comprises:
- a plurality of first vertical transfer electrodes corresponding to the first charge reading regions; and
- a plurality of second vertical transfer electrodes corresponding to the second charge reading regions, in which the first vertical transfer electrodes are positioned at positions different from the second vertical transfer electrodes.

3. A solid-state imaging device according to claim 2, wherein the vertical transfer channels comprise a linear shape which elongates in the column direction between the subsets of the photoelectric conversion elements arranged in the column direction, wherein the vertical transfer electrodes comprise a meandering shape which elongates in the row direction as a whole between the photoelectric conversion elements, wherein the first photoelectric conversion elements and the second photoelectric conversion elements have substantially equal lengths in the row direction with respect to their centers, and wherein the first photoelectric conversion elements have lengths in the column direction with respect to the centers longer than that of the second photoelectric conversion elements.

4. A solid-state imaging device according to claim 2, wherein the vertical transfer channels comprise a meandering shape which elongates in the column direction as a whole between the photoelectric conversion elements, wherein the vertical transfer electrodes comprise a meandering shape which elongates in the row direction as a whole between the photoelectric conversion elements, wherein the first photoelectric conversion elements have lengths in the row direction with respect to their centers longer than that of the second photoelectric conversion elements, and wherein the first photoelectric conversion elements have lengths in the column direction with respect to the centers longer than that of the second photoelectric conversion elements.

5. A method of driving a solid-state imaging device according to claim 2, the method comprising:
- conducting application of a first read pulse to the first vertical transfer electrodes and application of a second read pulse to the second vertical transfer electrodes in different fields; and
- independently reading out signals corresponding to charges respectively from the first photoelectric conversion elements and the second photoelectric conversion elements.

6. A method of driving a solid-state imaging device according to claim 2, the method comprising:
- conducting application of a first read pulse to the first vertical transfer electrodes; and
- reading out only charges from the first photoelectric conversion elements.

7. A method of driving a solid-state imaging device according to claim 2, wherein said plurality of charge reading regions comprises:
- a plurality of third charge reading regions corresponding to odd ones of the subsets of the photoelectric conversion elements arranged in the row direction; and
- a plurality of fourth charge reading regions corresponding to even ones of the subsets of the photoelectric conversion elements arranged in the row direction, wherein the method comprises:
- conducting application of a third read pulse to an electrode in of said plurality of vertical transfer electrodes corresponding to the third charge reading regions and application of a fourth read pulse to ones of said plurality of vertical transfer electrodes corresponding to the fourth charge reading regions in different fields; and reading out charges from the odd ones of the subsets of the photoelectric conversion elements arranged in the row direction separately from charges from the even ones of the subsets of the photoelectric conversion elements arranged in the row direction.

8. A method of driving a solid-state imaging device according to claim 7, wherein said plurality of charge reading regions comprises:
a plurality of fifth charge reading regions corresponding to odd ones of the subsets of the photoelectric conversion elements arranged in the column direction; and
a plurality of sixth charge reading regions corresponding to even ones of the subsets of the photoelectric conversion elements arranged in the column direction,
wherein the method comprises:
conducting application of a fifth read pulse to an electrode in of said plurality of vertical transfer electrodes corresponding to the fifth charge reading regions and application of a sixth read pulse to ones of said plurality of vertical transfer electrodes corresponding to the sixth charge reading regions in a same field; and
reading out charges from one of the first photoelectric conversion elements and charges from one of the second photoelectric conversion elements with being mixed with each other, said one of the first photoelectric conversion elements and said one of the second photoelectric conversion elements being adjacent to each other in the column direction.

9. A solid-state imaging device according to claim 1, wherein said plurality of first photoelectric conversion elements and said plurality of second photoelectric conversion elements are arranged in a checkerboard pattern.

10. A solid-state imaging device according to claim 1, further comprising:
a vertical transfer electrode formed between said first photoelectric conversion elements and said second photoelectric conversion elements which are adjacent to each other in the column direction, such that charges from said adjacent first and second photoelectric conversion elements axe mixed by using said vertical transfer electrode for reading out said adjacent first and second photoelectric conversion elements.

11. A solid-state imaging device according to claim 1, wherein said plurality of first photoelectric conversion elements and said plurality of second photoelectric conversion elements comprise octagonal shaped elements.

12. A solid-state imaging device according to claim 1, further comprising:
plural vertical transfer portions formed in a column direction on the semiconductor substrate and respectively corresponding to plural columns of said photoelectric conversion elements in said square lattice pattern.

13. A solid-state imaging device according to claim 1, further comprising:
plural vertical transfer electrodes formed in a row direction on said semiconductor substrate.

14. A solid-state imaging device according to claim 1, further comprising:
first and second charge reading regions which read out charges from said first and second photoelectric conversion elements, respectively, to vertical transfer channels.

15. A solid-state imaging device according to claim 1, wherein said plurality of first photoelectric conversion elements and said plurality of second photoelectric conversion elements comprise a rectangular shape.

16. The solid-state imaging device according to claim 15, wherein the length of said first photoelectric conversion elements in a column direction is greater than a length of the first photoelectric conversion elements in the row direction.

17. A solid-state imaging device according to claim 1, wherein said plurality of first photoelectric conversion elements and said plurality of second photoelectric conversion elements comprise photodiodes having a rectangular shape.

18. The solid-state imaging device according to claim 1, wherein said fourth photoelectric conversion element is adjacent in a row direction to said first photoelectric conversion element of said plural pairs of photoelectric conversion elements, and said third photoelectric conversion element is adjacent in a row direction to said second photoelectric conversion element of said plural pairs of photoelectric conversion elements.

19. A method of driving a solid-state imaging device, comprising:
providing a solid-state imaging device comprising:
a semiconductor substrate;
plural first photoelectric conversion elements formed in a pattern of columns and rows on said substrate;
plural second photoelectric conversion elements alternately formed in said columns and rows with said plural first photoelectric conversion elements, said second photoelectric conversion elements comprising a dimension that is less than a dimension of said first photoelectric conversion elements such that said second photoelectric conversion elements have a charge accumulation capacity that is less than a charge accumulation capacity of said first photoelectric conversion elements, and conducting photoelectric conversion of incident light at a lower sensitivity than said first photoelectric conversion elements;
plural color filters formed on said plural first and second photoelectric conversion elements; and
plural first and second vertical transfer electrodes formed on said substrate;
conducting application of a first read pulse to the first vertical transfer electrodes arid application of a second read pulse to the second vertical transfer electrodes in different fields;
independently reading out signals corresponding to charges respectively from the first photoelectric conversion elements and the second photoelectric conversion elements,
wherein the first photoelectric conversion elements have a length in a column direction which is greater than a length of the second photoelectric conversion elements in the column direction, and a length in a row direction which is substantially equal to a length of the second photoelectric conversion elements in the row direction,
wherein said plural first and second photoelectric conversion elements comprise plural pairs of photoelectric conversion elements comprising:
a first photoelectric conversion element of said plural first photoelectric conversion elements having a green color filter of said plural color filters; and
a second photoelectric conversion element of said plural second photoelectric conversion elements, which is adjacent to said first photoelectric conversion element in a column direction and has a green color filter of said plural color filters, and
wherein said plurality of the electric conversion elements comprises plural sets of photoelectric conversion elements comprising:
a third photoelectric conversion element of said plurality of first photoelectric conversion elements having a red color filter of said plurality of color filters;

a fourth photoelectric conversion element of said plurality of second photoelectric conversion elements, which is adjacent to said third photoelectric conversion element in the column direction and has a red color filter of said plurality of color filters; and a fifth photoelectric conversion element of said plurality of second photoelectric conversion elements, which is adjacent to said third photoelectric conversion element in a direction opposite to the column direction and has a blue color filter of said plurality of color filters.

20. A digital camera comprising:

a solid-state imaging device comprising:

a semiconductor substrate;

plural first photoelectric conversion elements formed in a pattern of columns and rows on said substrate;

plural second photoelectric conversion elements alternately formed in said columns and rows wit said plural first photoelectric conversion elements, said second photoelectric conversion elements comprising a dimension that is less than a dimension of said first photoelectric conversion elements such that said second photoelectric conversion elements have a charge accumulation capacity that is less than a charge accumulation capacity of said first photoelectric conversion elements, and conducting photoelectric conversion of incident light at a lower sensitivity than said first photoelectric conversion elements;

plural color filters formed on said plural first and second photoelectric conversion elements; and a digital signal processing section which combines image data based on charges from said first and second photoelectric conversion elements which are adjacent to each other in a column direction, wherein the first photoelectric conversion elements have a length in a column direction which is greater than a length of the second photoelectric conversion elements in the column direction, and a length in a row direction which is substantially equal to a length of the second photoelectric conversion elements in the row direction, wherein said plural first and second photoelectric conversion elements comprise plural pairs of photoelectric conversion elements comprising:

a first photoelectric conversion element of said plural first photoelectric conversion elements having a green color filter of said plural color filters; and a second photoelectric conversion element of said plural second photoelectric conversion elements, which is adjacent to said first photoelectric conversion element in a column direction and has a green color filter of said plural color filters, and wherein said plurality of photoelectric conversion elements comprises plural sets of photoelectric conversion elements comprising:

a third photoelectric conversion element of said plurality of first photoelectric conversion elements having a red color filter of said plurality of color filters;

a fourth photoelectric conversion element of said plurality of second photoelectric conversion elements, which is adjacent to said third photoelectric conversion element in the column direction and has a red color filter of said plurality of color filters; and a fifth photoelectric conversion element of said plurality of second photoelectric conversion elements, which is adjacent to said third photoelectric conversion element in a direction opposite to the column direction and has a blue color filter of said plurality of color filters.

* * * * *